(12) United States Patent
Yang

(10) Patent No.: US 6,386,175 B2
(45) Date of Patent: *May 14, 2002

(54) FUEL INJECTION

(75) Inventor: Jialin Yang, Canton, MI (US)

(73) Assignee: Ford Global Technologies, Inc., Dearborn, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/262,921

(22) Filed: Mar. 5, 1999

(51) Int. Cl.$^7$ ................................................. F02B 3/00
(52) U.S. Cl. ................................................ 123/298; 123/295
(58) Field of Search ................................. 123/295, 305, 123/280, 298, 472, 294; 239/533.1–533.14

(56) References Cited

U.S. PATENT DOCUMENTS

| | | | |
|---|---|---|---|
| 1,981,874 A | 11/1934 | Mock | 123/32 |
| 2,183,284 A | 12/1939 | Wiebicke | 123/280 |
| 2,914,257 A | 11/1959 | Wiant | 123/280 |
| 3,195,520 A | 7/1965 | Simko | 123/32 |
| 3,294,072 A | 12/1966 | Simko et al. | 123/279 |
| 3,315,650 A | 4/1967 | Bishop et al. | 123/295 |
| 3,838,821 A | 10/1974 | Berlyn | 123/295 |
| 4,006,719 A | 2/1977 | Kanda et al. | 123/32 JV |
| 4,019,473 A | 4/1977 | Kamiya | 123/32 |
| 4,046,111 A | 9/1977 | Nagano | 123/32 |
| 4,186,708 A | 2/1980 | Bowler | 123/139 |
| 4,318,377 A | 3/1982 | Occella et al. | 123/279 |
| 4,372,264 A | 2/1983 | Trucco | 123/255 |
| 4,389,986 A | 6/1983 | Tanasawa | 123/295 |
| 4,394,963 A | 7/1983 | Iwata | 239/89 |
| 4,413,780 A | 11/1983 | Skinner et al. | 239/533.4 |
| 4,543,929 A | 10/1985 | Kataoka et al. | 123/263 |
| 4,574,754 A | 3/1986 | Rhoades, Jr. | 123/298 |
| 4,685,432 A | 8/1987 | Saito et al. | 123/276 |
| 4,753,213 A | 6/1988 | Schlunke et al. | 123/533 |
| 4,770,138 A | 9/1988 | Onishi | 123/276 |
| 4,788,942 A | 12/1988 | Pouring et al. | 123/26 |
| 4,852,525 A | 8/1989 | Ishida | 123/276 |
| 5,054,444 A | 10/1991 | Morikawa | 123/295 |
| 5,078,107 A | 1/1992 | Morikawa | 123/295 |
| 5,086,737 A | 2/1992 | Watanabe et al. | 123/295 |
| 5,105,781 A | 4/1992 | Fortnagel et al. | 123/280 |
| 5,277,159 A | 1/1994 | Webster | 123/254 |
| 5,322,043 A | 6/1994 | Shriner et al. | 123/306 |
| 5,329,901 A | 7/1994 | Onishi | 123/254 |
| 5,357,924 A | 10/1994 | Onishi | 123/276 |
| 5,522,357 A | 6/1996 | Nogi et al. | 123/261 |
| 5,553,579 A | 9/1996 | Yoshida et al. | 123/295 |
| 5,553,588 A | 9/1996 | Gono et al. | 123/276 |
| 5,605,125 A | 2/1997 | Yaoita | 123/275 |
| 5,709,190 A | 1/1998 | Suzuki | 123/302 |
| 5,722,362 A | 3/1998 | Takano et al. | 123/295 |
| 5,813,385 A | 9/1998 | Yamauchi et al. | 123/276 |

FOREIGN PATENT DOCUMENTS

| | | |
|---|---|---|
| GB | 2 148 394 A | 10/1984 |
| IT | 535029 | 10/1955 |
| JP | 61-218772 | 9/1986 |

Primary Examiner—Henry C. Yuen
(74) Attorney, Agent, or Firm—Jerome R. Drouillard

(57) ABSTRACT

A stratified charge is formed in an engine by injecting fuel at an impingement surface adjacent an outlet of the injector. The injected fuel thereby forms a cloud shallowly penetrating the combustion chamber so as to float therein to reduce wall-wetting and subsequent soot formation. A substantially flat top piston urges the cloud upwardly during a compression stroke of the engine. The cloud remains substantially unmixed with the inducted air, thereby producing the stratified charge. The continued motion of the piston causes the cloud to move toward the spark plug for ignition.

23 Claims, 3 Drawing Sheets

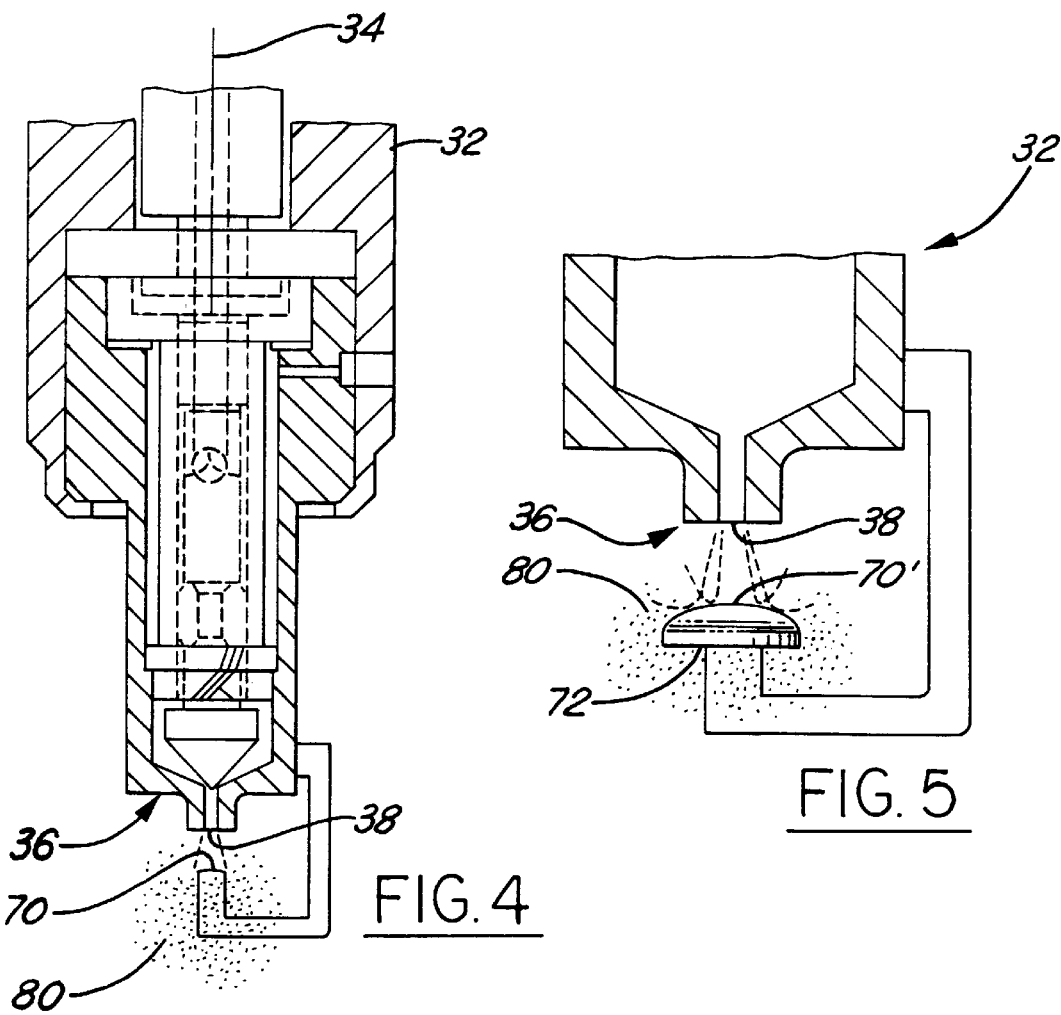
FIG. 4
FIG. 5
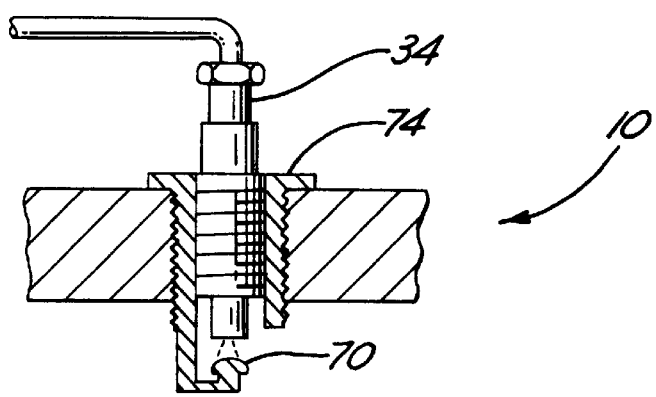
FIG. 6

FUEL INJECTION

FIELD OF THE INVENTION

The present invention relates to fuel injection in an internal combustion engine and more particularly to forming a cloud of fuel in such engines.

BACKGROUND OF THE INVENTION

Direct injection engines are aimed at improving fuel economy at low engine loads by providing a stratified charge in the combustion chamber. A stratified charge engine is one in which the combustion chamber contains stratified layers of different air/fuel mixtures. The strata closest to the spark plug contains a mixture slightly rich of stoichiometry, and subsequent strata contain progressively leaner mixtures. The overall air/fuel mixture within the combustion chamber is lean of stoichiometry, thereby improving overall fuel economy at low loads. At high engine loads, typically greater than 50% of full engine load, a homogeneous air-fuel mixture is provided in the combustion chamber.

Conventional direct injection engines typically include a piston having a depression in the top face thereof (typically referred to as a bowl) and a swirl or tumble control valve located in the intake port to produce a swirl or tumble of the air entering the combustion chamber. As fuel is injected into the combustion chamber, the fuel impinges against the bottom of the bowl and cooperates with the motion of the air in the chamber to produce the stratified charge, with the richest portion of the charge moving toward the ignition source.

The inventors of the present invention have recognized certain disadvantages with these prior art engines. For example, because the fuel sprayed from the fuel injector is directed toward the piston bowl, it is likely that a portion of the fuel will stick to the piston surface causing an undesirable wall-wetting condition. As the remainder of the fuel is burned, the flame propagating toward the piston surface is unable to completely burn the liquid fuel film on the piston surface. This results in undesirable soot formation during combustion.

In addition, because the design of these engines relies on the fuel impinging against the bowl and subsequently directed toward the spark plug, fuel injection timing is of a major concern. In direct injection engines, fuel injection is a function of time whereas the motion of the piston is a function of crank angle. In port injected engines, fuel entering the chamber is a function of crank angle because the opening of the intake valve is a function of crank angle. As a result, it is imperative to control the timing of fuel injection in a direct injection engine so that the injected fuel may impinge on the bowl at the proper time and the fuel cloud may move toward the spark plug. In other words, if the fuel is injected too early, the spray may miss the bowl entirely, thereby not deflecting toward the spark plug. If the fuel is injected too late, then excess wall-wetting may occur.

Further, the inventors of the present invention have found that with bowl-in-piston engines, switching between a stratified charge and a homogeneous charge occurs at part loads ranging between 30% to 40% of full engine load. As the engine load increases, more fuel is required. However, because of the physical limitations of the bowl (i.e. the size of the bowl relative to the size of the combustion chamber), the amount of fuel that can be placed in the bowl and still attain a stratified charge is limited. Otherwise, the potential for wall wetting and subsequent soot formation may increase. As a result, above about 40% of full engine load, fuel economy is compromised.

Other disadvantages with prior art engines results in a heavier piston, increased engine height to accommodate the larger piston, a larger combustion chamber surface to volume ratio, more heat loss, and increased charge heating during the intake and compression strokes, which increases the tendency for engine knocking.

Furthermore, with port injection, the fuel impinges on the valve and intake port. At cold startup, the valve and port may be cool and the fuel will not vaporize as desired, causing high HC emissions and soot. During transient conditions, valve and port wetting by the fuel results in a longer response time from the change of fuel injection pulse width to the change in fuel that enters the cylinder. This increases the difficulty in fuel metering control, fuel consumption, and HC/CO emissions.

In copending application, 08/925,131, ('131 application) assigned to the assignee of the present invention, and which is incorporated herein by reference in its entirety, a fuel cloud is directly injected into a combustion chamber. The present invention is directed, in part, at improving the formation of a cloud of fuel in the combustion chamber.

SUMMARY OF THE INVENTION

An object of the present invention is to provide a direct injection spark ignition engine which overcomes the disadvantages of prior technology. This object is achieved, and disadvantages of prior art approaches overcome, by providing a method of forming a fuel cloud in the combustion chamber using an impingement target immediately adjacent the fuel outlet of the fuel injector. The fuel strikes the target at a high velocity and forms a cloud of fuel thereabout. The fuel then remains suspended in the combustion chamber creating a relatively rich strata near the spark plug.

An advantage of the present invention is that wall-wetting on the piston surface is reduced.

Another, more specific, advantage of the present invention is that a near complete combustion occurs with little or no soot formation with low HC and $NO_x$ formation.

Yet another advantage of the present invention is that a less complex engine is provided in that no bowl is required for the piston.

Still another advantage of the present invention is that regulated emissions may be reduced.

Another advantage of the present invention is that the engine load range in which a stratified charge may be produced is extended.

Other objects, features and advantages of the present invention will be readily appreciated by the reader of this specification.

BRIEF DESCRIPTION OF THE DRAWINGS

The invention will now be described, by way of example, with reference to the accompanying drawings, in which:

FIGS. 4–5 are diagrammatic cross-sectional representations of a fuel injector according to the present invention; and, FIG. 6 is a diagrammatic representations of alternative fuel injector mounting according to the present invention.

DETAILED DESCRIPTION OF THE PREFERRED EMBODIMENTS

Figure 1:
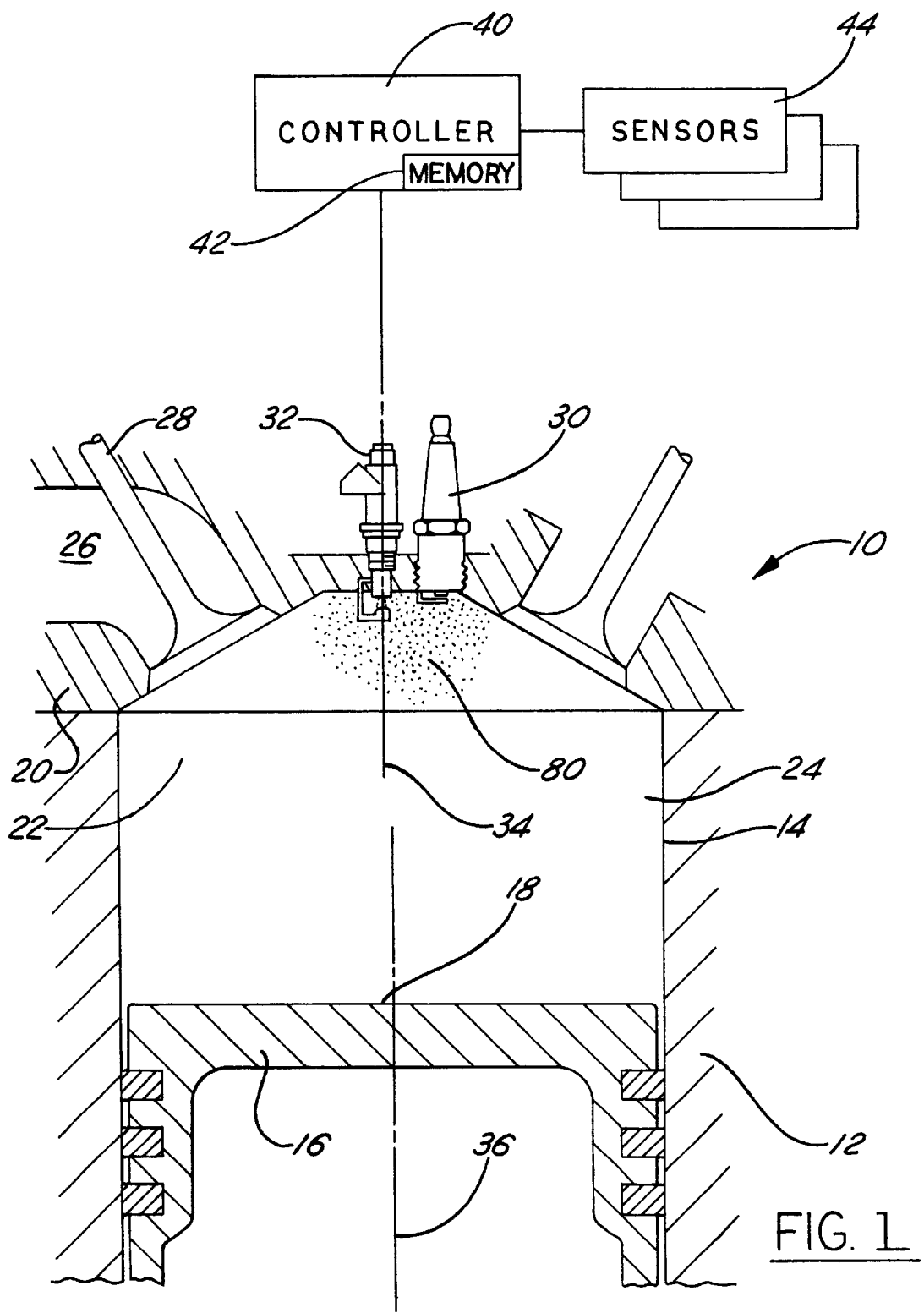
FIGS. 1 and 2 are a diagrammatic cross-sectional representations of a direct injection engine according to the present invention.
Figure 2:
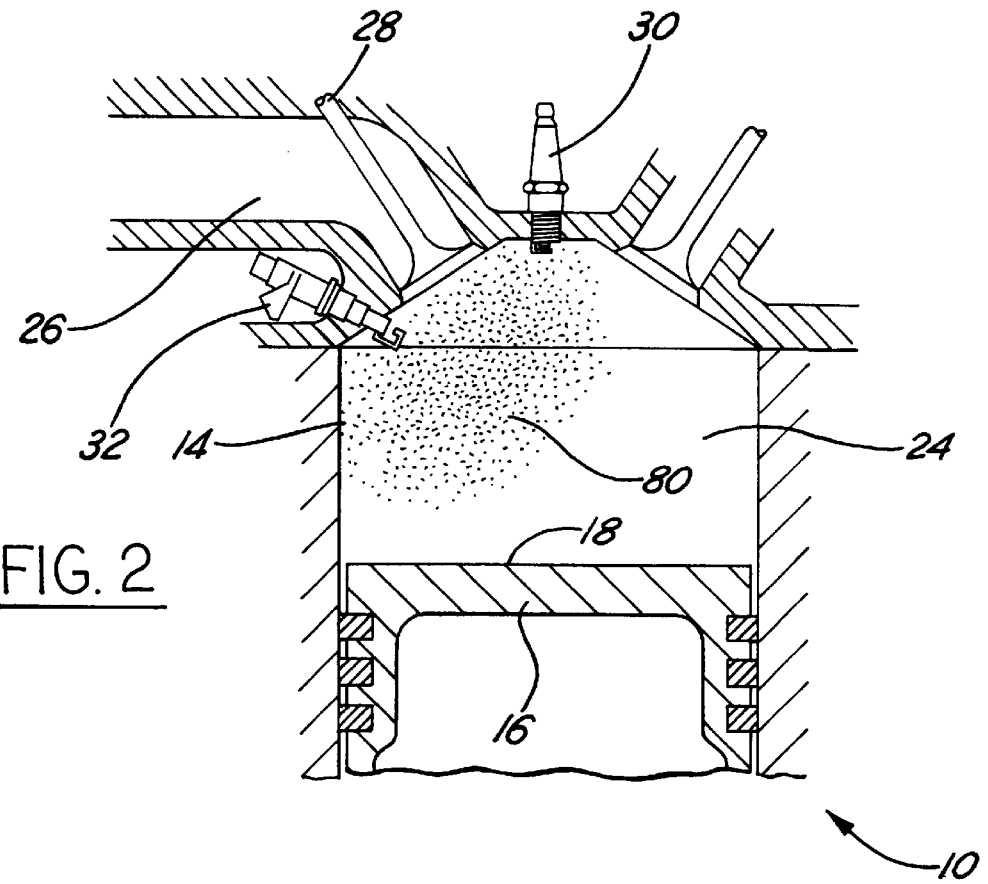
Figure 3:
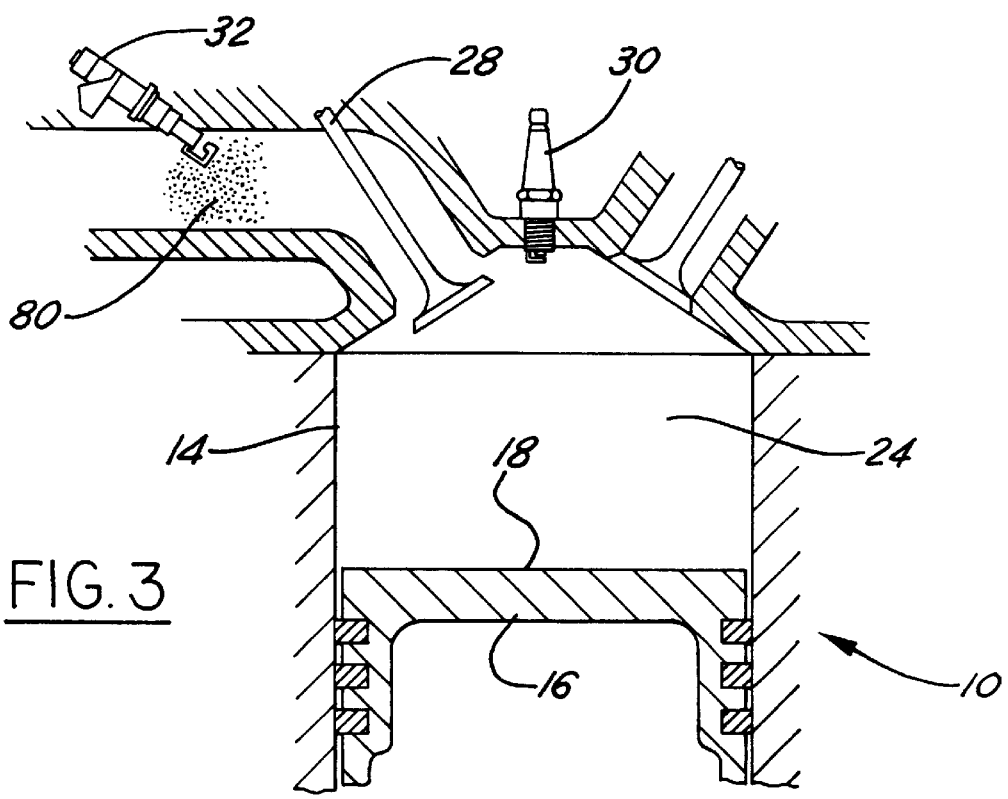
FIG. 3 is a diagrammatic cross-sectional representations of a port injection engine according to the present invention.

An internal combustion engine 10 according to the present invention, as shown in FIGS. 1–3, includes a cylinder block 12, having a cylinder bore 14 formed therein and a piston 16 reciprocally housed within the bore 14. The piston 16 has a substantially flat top 18, i.e. without a substantial piston bowl formed therein. A cylinder head 20 is attached to the block 12 and encloses a top end 22 of the bore 14 to form a combustion chamber 24. The engine 10 is preferably a multi-valve engine having, for example, two intake ports and two exhaust ports. For the sake of clarity, only one intake port 26 is shown and is formed within the cylinder head 20 and communicates with the combustion chamber 24 through an intake valve 28.

An intake port 26 provides intake air within the combustion chamber 24. In a preferred embodiment, the intake port 26 comprises a conventional intake port providing little or no swirl or tumble, although deactivation of one of the intake valves may produce some swirl motion. One skilled in the art appreciates that the intake port may be modified in a known manner to provide tumble and/or swirl motion as desired to promote flame propagation and combustion. Furthermore, a particular combustion chamber may work better with tumble and/or swirl motion to properly locate the cloud 80-near the spark plug 30 for ignition.

The engine 10 includes a spark plug 30 communicating with the combustion chamber 24 for igniting an air/fuel mixture within combustion chamber 24. The engine 10 further includes a fuel injector 32 defining an axis 34 for injecting fuel directly into the combustion chamber 24 in FIGS. 1–2 and into the intake port in FIG. 3. In the example of FIG. 1, the injector 32 is generally located along axis 36 of the cylinder 14. However, the injector 32 need not be coincident with the axis 36. In fact, the injector 32 may be mounted on the side of cylinder bore 14, typically referred to as a side mounted injector, as shown in the example illustrated in FIG. 2. Likewise, an injector 32 may be provided in an intake port as illustrated in FIG. 3 for a port fuel injected engine.

As shown in FIG. 4, the injector 32 includes tip 36 having an orifice 38 for injecting fuel from a fuel system (not shown) to the combustion chamber 24. The injector 32 further includes an impingement surface 70 provided adjacent the orifice 38. Preferably the impingement surface comprises a convex surface as illustrated in FIG. 4. In a further embodiment illustrated in FIG. 5, the convex impingement surface 70' has a recess 72 formed thereunder, forming a "mushroom-shaped" impingement surface 70'. The embodiments of FIGS. 4 and 5 illustrate the impingement surface provided on the injector 32 itself. One skilled in the art appreciates the impingement surface 70 may be formed in the engine itself, such as on the head (not shown), or provided in an insert 74 mounted to the engine, and preferably threadably engaged thereto. The injector 32' is engaged with the insert 74, preferably through a second threaded attachment.

The engine 10 further includes a controller 40 (see FIG. 1) having a memory storage device 42. A plurality of sensors 44 sense numerous engine operating parameters such as engine speed, engine load, spark timing, EGR rate, fuel delivery rate, engine air charge temperature, engine coolant temperature, intake manifold absolute pressure, the operating position of the throttle, vehicle gear selection, vehicle speed, intake manifold air mass flow rate, accelerator position, and other parameters known to those skilled in the art and suggested by this disclosure.

As described above, the impingement surface 70 is preferably convex in cross section and preferably has a substantially spherical shape. One skilled in the art appreciates that the shape of the impingement surface may be altered to include substantially flat or concave or conical, etc. surfaces and yet achieve some of the beneficial effects described herein, but the inventor has found the spherical shape, especially using the recess 72, provides the most beneficial operation by minimizing wetting and maximizing fuel droplet dispersion and achieve the desired fuel penetration.

The principle under which my invention works is as follows. The fuel is injected from the injector tip 36 at high speed. The impingement surface 70 is provided as close to the orifice 38 as possible to maximize the velocity at which the fuel strikes the surface 70. As one positions the surface further from the orifice 38, the fuel slows prior to striking the surface 70 due to the air resistance met within the combustion chamber 24 and more fuel may be inclined to wet the surface 70 at lower reflex velocities.

The inventor has found empirically that a commercially available fuel injector 32 having a 45 degree coangle injecting fuel at approximately 70 bar will properly strike a surface 70 positioned approximately 1.5 mm from the orifice 38. At this distance, the fuel cone angle is such that almost all of the fuel stream strikes the surface 70 and is deflected thereby. Furthermore, the surface 70 is close to the injector, so the velocity of the stream is not significantly reduced before striking the surface 70. Preferably the fuel leaves the injector 32 at approximately 60–100 m/s. Upon deflection, the fuel breaks into small droplets, promoting fast vaporization. The velocity of the deflected droplets is decreased from the injected velocity. The fuel is deflected into a cloud 80, and the velocity of the fuel is reduced. This promotes a cloud 80 of small fuel droplets and vapor. If the surface 70 is positioned too close to the orifice 38, the fuel will be deflected back toward the injector. If positioned too far from the orifice 38, the fuel stream will not all strike the surface 70 as described above and a desired cloud 80 will not be formed, plus the velocity of the stream will be reduced prior to impacting the surface 70 and not deflect as desired.

One skilled in the art appreciates that a Port Fuel Injection (PFI) application may use a similar system, preferably including an injector having a smaller injector coangle than a DI application, and therefore the cone angle may be significantly smaller than the 45 degrees described in the example above, perhaps as small as 10 or 15 degrees, and, depending on the distance the impingement surface is placed from the injector, the injector coangle may be as wide as 40 degrees or more. Likewise, the velocity of the fuel from the injector in a PFI application is likely to be lower than the DI velocity, dependent again upon many factors. Initial tests show that a PFI injector may operate with a velocity range as low as about 20–40 m/s, and depending upon other factors as described above, this range may be expanded.

One skilled in the art appreciates that a number of variables affect the stream coming from the injector and therefore the numbers described above are representative for a particular embodiment. For example, if the pressure in the combustion chamber is increased, the diameter of the stream may be reduced (this effect is less as one is closer to the injector). Likewise, all other things being equal, a lower injector angle will produce a narrower stream. In this case, one skilled in the art appreciates the surface 70 may be smaller or further positioned from the orifice 38, depending on several variables, including those described above.

An advantage of the present invention is that the fuel cloud 80 does not substantially strike the piston surface 18, if at all. Thus, air is entrapped between the piston 16 and the cloud 80, thereby forming a lean mixture above the piston.

This enables lower hydrocarbon (HC) and soot production from the combustion process. Similarly, the cloud 80 is pushed upwardly by the piston 16 during the compression stroke, and therefore a rich mixture is formed near the spark plug 30, thereby enabling proper ignition and combustion. And this stratified operation enables lean operation in some instances. Furthermore, the injection may occur later in the cycle because the lower penetration will enable proper fuel mixture at the spark plug 30. This also promotes lower levels of $NO_x$ production.

The present invention, when used in a DI application, does not require the fuel to be directed toward the spark plug 30 with the piston surface 18, and therefore the location of the piston relative to the plug 30 is not critical to position fuel near the plug 30. This is contrary to the applications where the fuel is injected onto the top of the piston and reflected by the shape of a bowl formed in the piston, as utilized for example in U.S. Pat. No. 5,553,588. The present invention therefore enables one to inject fuel later in the compression stroke, as it is not necessary to position the piston in the proper position to reflect the fuel, and the present invention may still also may eliminate piston wetting at such late injection. Furthermore, at high load, a direct injection engine is preferably run at approximately homogeneous charge. In such a case, fuel is injected after about 100 crank angle degrees after top dead center of the intake stroke. A nearly homogeneous charge may thereby be formed in the combustion chamber, but the cloud will result in a leaner mixture near the bottom of the combustion chamber. This reduces hydrocarbon loading at the piston/linear crevices and thereby improves emissions.

Similarly, in a Port Fuel Injection system (PFI), emissions are improved. In the PFI engine, the charge is substantially homogeneous under most operating conditions. The impingement improves the fuel penetration and valve wetting is reduced or eliminated. Therefore, the engine may employ open-valve injection to improve cold start and transient operation.

According to the present invention, fuel injector 32 injects fuel into the combustion chamber 24 at a predetermined velocity along axis 34 of injector 32 and at a predetermined initial cone angle. In one embodiment, fuel is injected during the compression stroke at about 60° before top dead center. The fuel strikes the impingement surface 70 and forms a cloud 80. Consequently, the injected fuel shallowly penetrates into combustion chamber 24 so as to float therein to reduce wall-wetting. As piston 16 progressively compresses the air within combustion chamber 24 during the compression stroke, the cloud is urged toward the top 22 of the combustion chamber by the action of the substantially flat top piston 16. The fuel thereby remains substantially unmixed with air inducted through intake port 26, thereby producing the stratified charge in combustion chamber 24. Further, the piston motion causes the cloud 80 to engulf the spark plug 30 so that the fuel may be ignited.

In a preferred embodiment, the droplet size for an undeflected fuel stream, as measured by the Sauter Mean Diameter method, is between about 15 μm and about 25 μm approximately 45 mm away from the tip of the injector 32 with the surface 70 removed. The injection velocity of the fuel entering into the combustion chamber is between about 60 m/s and about 100 m/s, as measured along axis 34 of injector 32. Also, the initial cone angle θ of fuel cone is between about 30° and about 60°, and preferably 45°. After deflection, the fuel droplet size is between approximately about 6 μm and about 12 μm.

The effects of having such a shallowly penetrating fuel injected from fuel injector 34 is clearly shown in the graphs of FIGS. 3–5 of the '131 application. In the '131 application, the benefits of vaporization and formation of a stratified charge are discussed in detail and therefore not presented here.

According to the present invention, controller 40 controls a switch point for switching between a stratified charge produced in combustion chamber 24, as described above, and a homogeneous charge. Those skilled in the art will recognize in view of this disclosure that changing between a stratified charge and a homogeneous charge may be accomplished by changing injection timing from the compression stroke to the intake stroke, for example. The switch point occurs at a point greater than about 50% of full engine load, and, more desirably, at a point between about 60% and about 70% of full engine load. This is due to the fact that a stratified charge may be produced in combustion chamber 24, as described above, with a relatively large amount of fuel being delivered therein without the potential for wall wetting and subsequent soot formation because the charge is not constrained by a bowl formed in piston surface 18 of a limited volume, but rather is constrained by the entire volume of combustion chamber 24.

While the best mode for carrying out the invention has been described in detail, those skilled in the art to which this invention relates will recognize various alternative designs and embodiments, including those mentioned above, in practicing the invention that has been defined by the following claims.

What is claimed is:

1. The method of forming a combustible fuel mixture for a spark ignition internal combustion engine, the engine having a cylinder block with a plurality of cylinder bores formed therein, the cylinder bore defining a longitudinal axis, a plurality of substantially flat top pistons each reciprocally housed within a cylinder bore, a cylinder head attached to the block and closing top ends of the bores to form a plurality of combustion chambers, an intake port formed in the cylinder head and communicating with the combustion chamber via an intake valve for introducing air into the combustion chamber, a fuel injector, defining an axis and communicating with the combustion chamber, for supplying fuel into the combustion chamber, and an ignition source communicating with the combustion chamber for igniting fuel within the combustion chamber, with said method comprising the steps of:

injecting fuel from the fuel injector having an outlet and a predetermined initial cone angle, into the engine at a predetermined velocity, said injected fuel impinging on a surface adjacent the outlet of said injector thereby forming a cloud shallowly penetrating the combustion chamber so as to float therein to reduce wall wetting, said impingement surface having a substantially spherical surface positioned approximately 1.25 mm from the outlet of said injector so substantially all of said jet strikes said surface;

urging said cloud upwardly in said combustion chamber with said substantially flat top piston during a compression stroke of the engine;

wherein said mixture comprises a stratified mixture and said cloud defines a relatively rich region and the remainder of the volume of the combustion chamber defines a lean region, with said fuel remaining substantially unmixed with said inducted air, thereby producing said stratified charge as said piston moves said cloud toward said ignition source.

2. A method according to claim 1 wherein said predetermined velocity is between about 60 m/s and about 100 m/s along the axis of the fuel injector.

3. A method according to claim 1 wherein said predetermined initial cone angle is between about 30° and about 60°.

4. A method according to claim 1 wherein an amount of fuel vaporized into said cloud relative to the amount of fuel injected is greater than about 95%.

5. A method according to claim 1 wherein said engine comprises a direct injection engine.

6. A fuel injected, spark ignition combustion engine, comprising:

a cylinder block;

a cylinder bore formed in said cylinder block, with said bore defining a longitudinal axis and having a top end;

a cylinder head attached to said block and closing said top end of said bore to form a combustion chamber;

an intake port formed in said cylinder head and communicating with said combustion chamber via an intake valve for inducting air into said combustion chamber;

a fuel injector, defining an axis, for injecting fuel into said combustion chamber, said injector having an outlet for injecting said fuel at a predetermined velocity and formed into a cone having a predetermined initial cone angle;

an impingement surface comprising a substantially spherical surface provided approximately 1.25 mm from said outlet of said injector, with said injected fuel striking said impingement surface thereby forming a fuel cloud for shallowly penetrating into said combustion chamber so as to float therein to reduce wall wetting; and a substantially flat top piston reciprocally housed within a said bore;

wherein said fuel remains substantially unmixed with said inducted air, thereby producing a stratified charge and wherein said cloud defines a relatively rich region and the remainder of the volume of the combustion chamber defines a lean region, with said substantially flat top piston urging said cloud upwardly during a compression stroke of the engine and an ignition source communicates with said combustion chamber with said cloud engulfing said ignition source so that said fuel is ignitable by said ignition source.

7. An engine according to claim 6 wherein said fuel is formed into a droplet size is between about 6 $\mu$m and about 12 $\mu$m after striking said impingement surface.

8. An engine according to claim 7 wherein said predetermined initial cone angle is between about 30° and about 60°.

9. An engine according to claim 8 wherein said predetermined velocity is between about 60 m/s and about 100 m/s along said axis of said fuel injector.

10. An engine according to claim 6 wherein an amount of fuel vaporized into said cloud relative to the amount of fuel injected is greater than about 95%.

11. An engine according to claim 6 further comprising an engine controller, with said engine controller being responsive to a plurality of engine operating parameters, with said controller causing a switch between a stratified charge and a homogeneous charge formed within the combustion chamber, with said switch occurring at an engine load of greater than about 50% of full engine load.

12. An engine according to claim 6, wherein said impingement surface has a spherical diameter of approximately 3 mm.

13. An engine according to claim 12, wherein said engine comprises a direct injection engine.

14. An engine according to claim 13, wherein said engine operates with a stratified charge.

15. An engine according to claim 12, wherein said engine comprises a port injection engine.

16. An engine according to claim 15, wherein said engine operates with a substantially homogeneous charge.

17. A stratified charge, direct injection, spark ignition internal combustion engine comprising:

a cylinder block;

a cylinder bore formed in said cylinder block, with said bore defining a longitudinal axis and having a top end;

a cylinder head attached to said block and closing said top end of said bore to form a combustion chamber;

an intake port formed in said cylinder head and communicating with said combustion chamber via an intake valve for inducting air into said combustion chamber;

a fuel injector, defining an axis, for injecting fuel directly into said combustion chamber at a predetermined velocity and having a spray jet exiting an outlet of the injector;

an impingement surface comprising a substantially spherical surface positioned approximately 1.25 mm from said outlet of said injector, said impingement surface having a size and positioned in close proximity to said outlet so substantially all of said jet strikes said surface, with said injected fuel thereby shallowly penetrating into said combustion chamber so as to form a cloud and float therein to reduce wall wetting;

a substantially flat top piston reciprocally housed within said bore, with said substantially flat top piston causing said injected fuel to move upwardly during a compression stroke of the engine, with said fuel remaining substantially unmixed with said inducted air, thereby producing said stratified charge; and, an ignition source communicating with said combustion chamber, with said cloud engulfing said ignition source so that said fuel is ignitable by said ignition source.

18. An engine according to claim 17 wherein said impingement surface is provided on said engine head.

19. An engine according to claim 17 wherein said impingement surface is provided on said injector.

20. An engine according to claim 17 wherein said impingement surface has a recess formed thereunder.

21. An engine according to claim 17 wherein said fuel is injected at approximately 100 degrees after intake.

22. An engine according to claim 17 wherein an amount of fuel vaporized into said cloud relative to the amount of fuel injected is greater than about 95%.

23. An engine according to claim 17 further comprising an engine controller, with said engine controller being responsive to a plurality of engine operating parameters, with said controller causing a switch between a stratified charge and a homogeneous charge formed within said combustion chamber, with said switch occurring at an engine load between about 60% and about 70% of full engine load.

* * * * *